Figure 1:
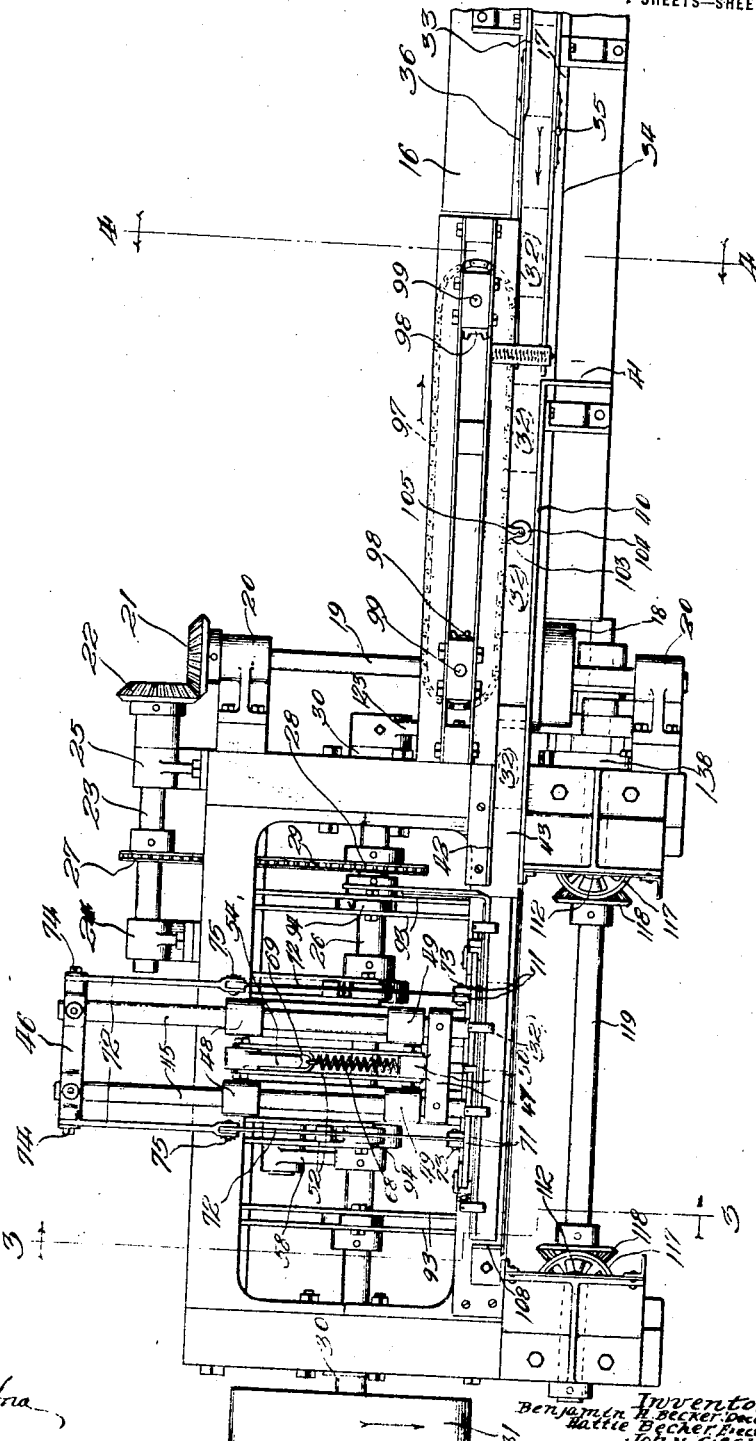

B. H. BECKER AND J. CIESLA.
H. BECKER, EXECUTRIX OF B. H. BECKER, DEC'D.
SOAP PACKING MACHINE.
APPLICATION FILED APR. 21, 1920.

1,367,852.

Patented Feb. 8, 1921.
7 SHEETS—SHEET 1.

Witness:
Stephen J. Kelma

Inventors:
Benjamin H. Becker, Deceased
Hattie Becker, Executrix
John Ciesla
Dyrenforth, Lee, Chritton & Wiles Attys

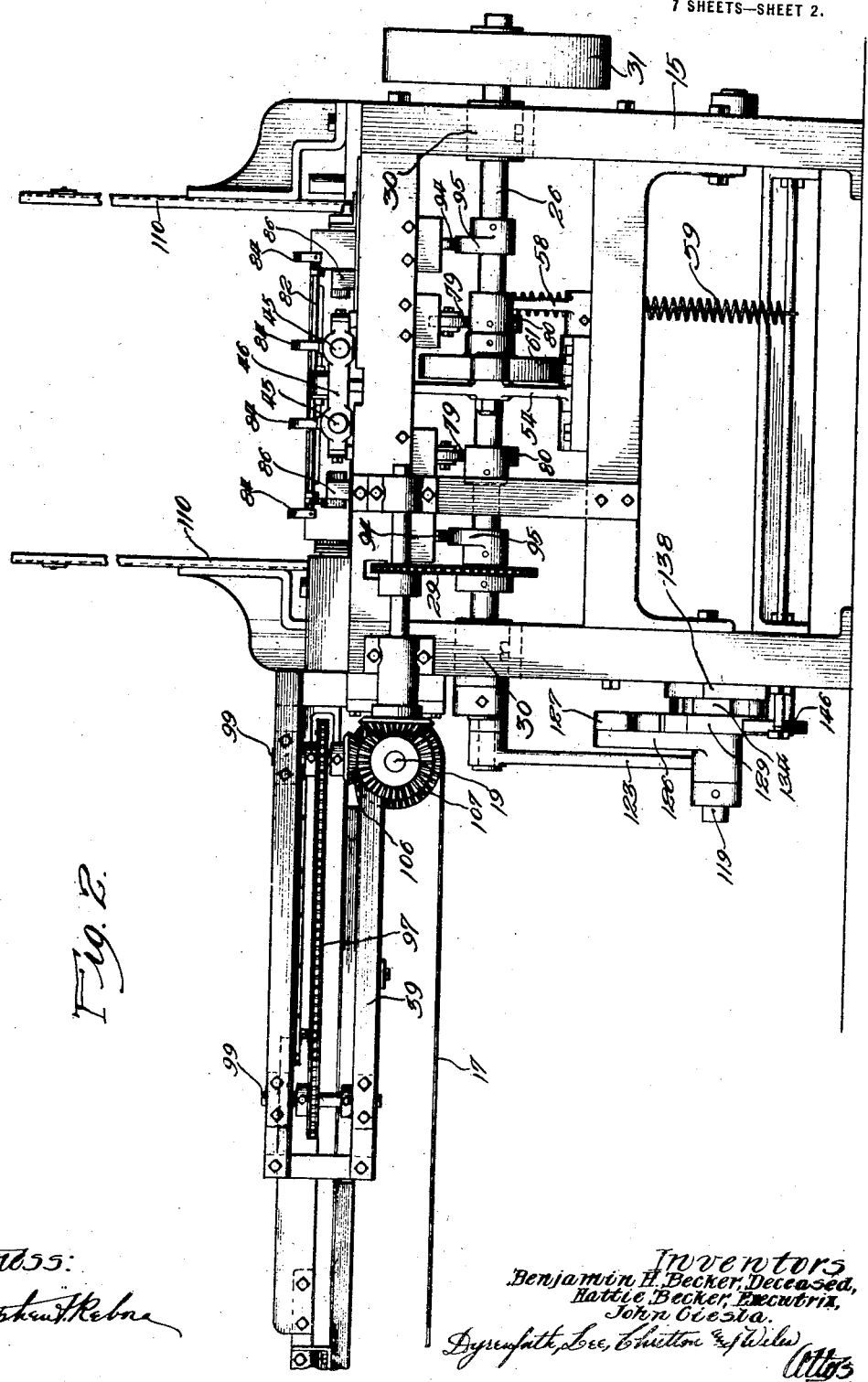

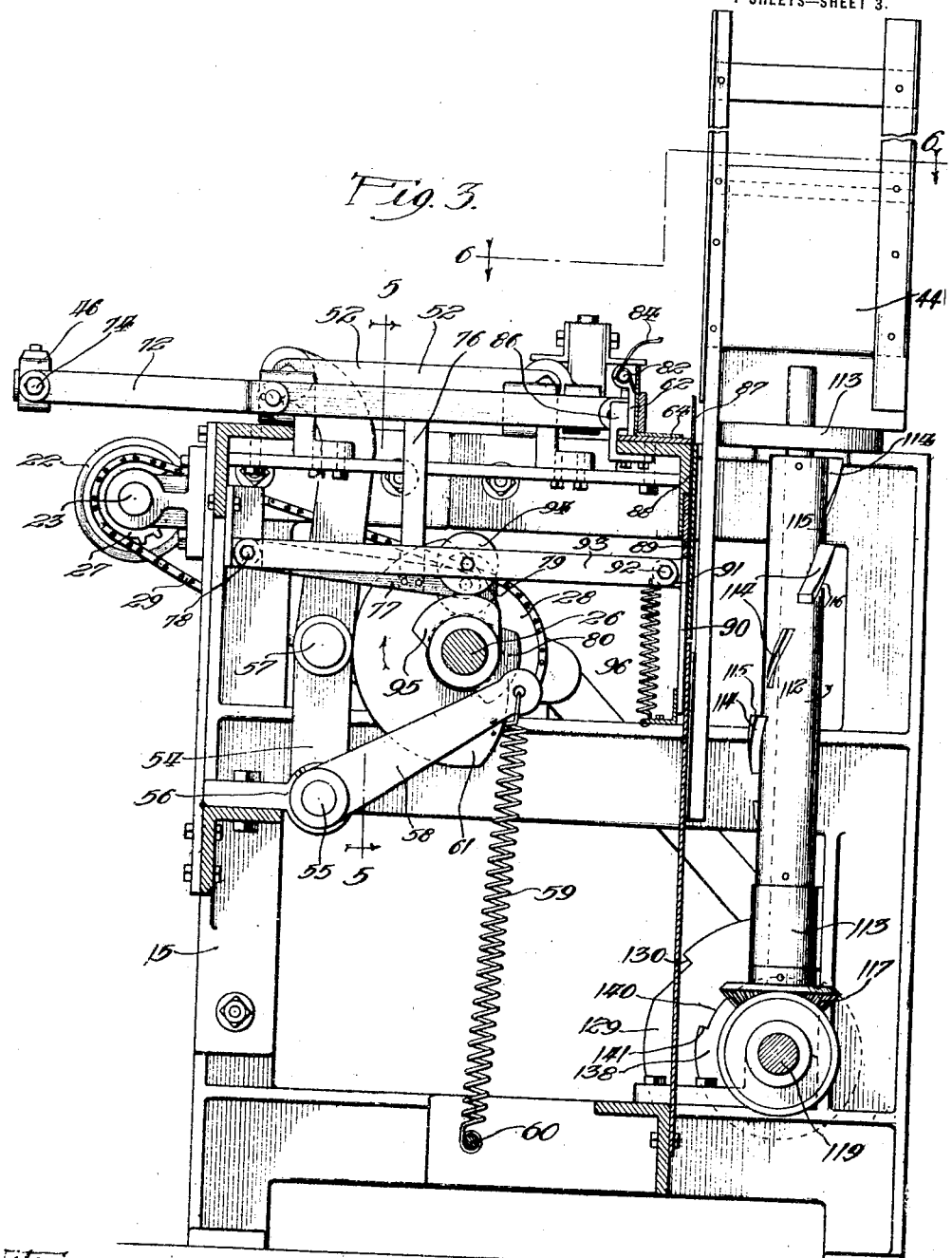

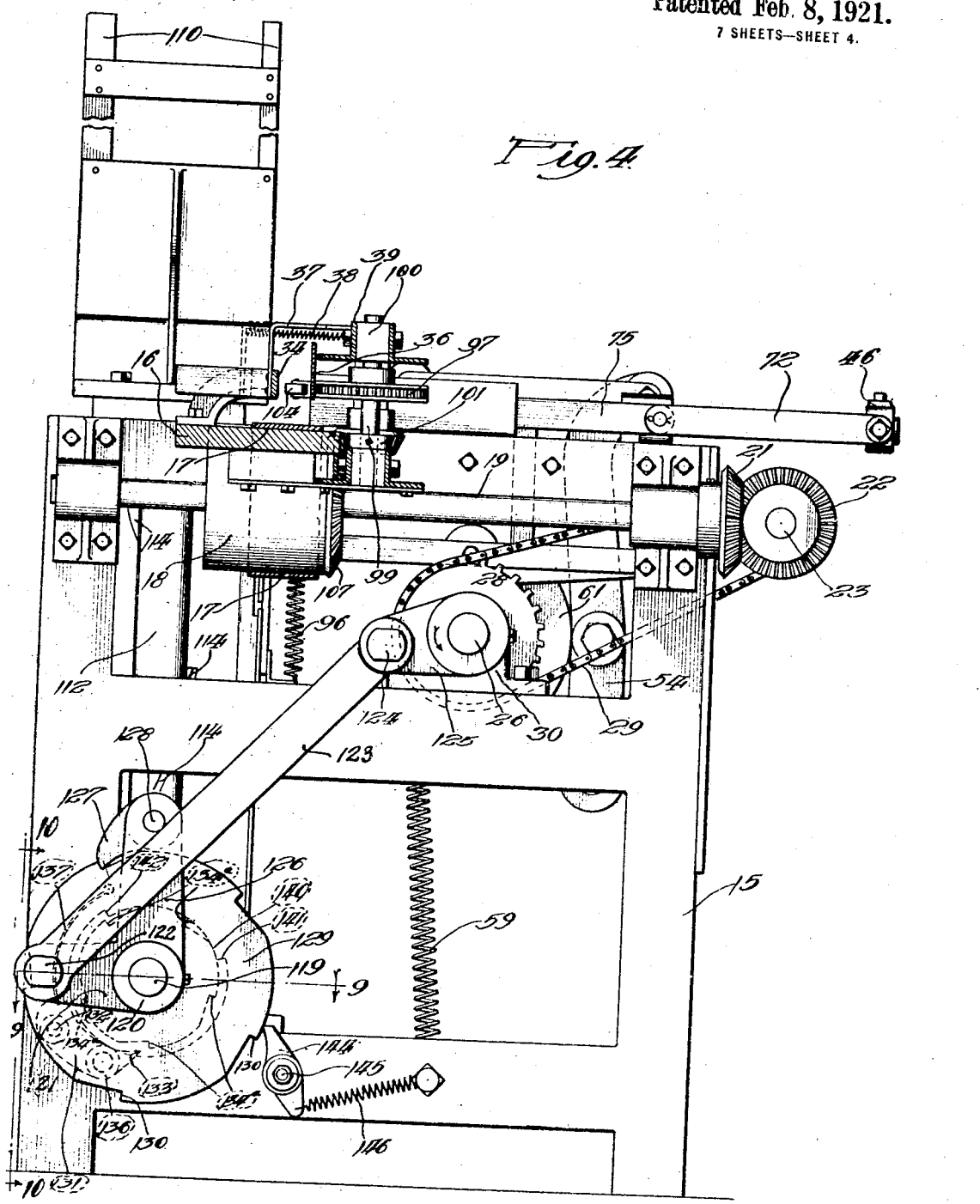

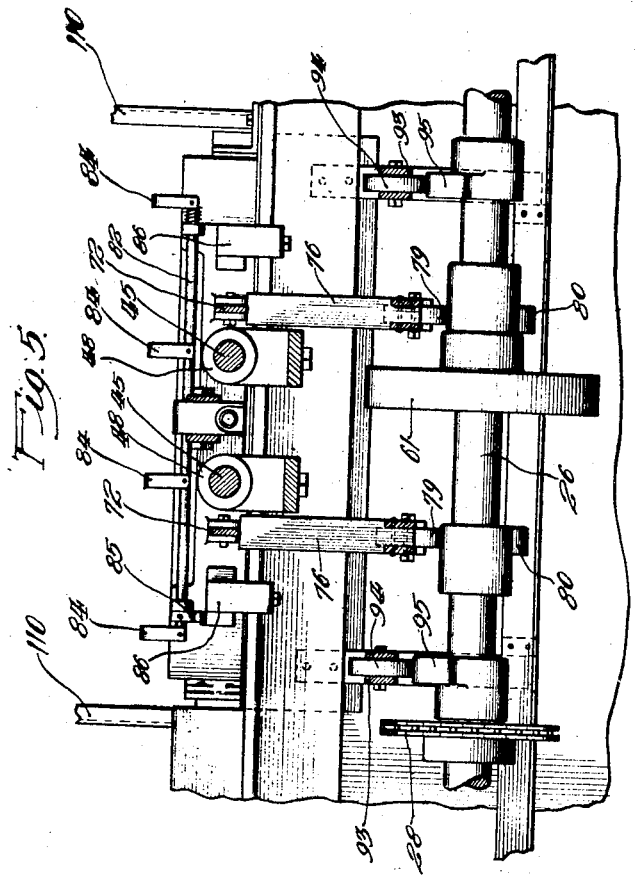

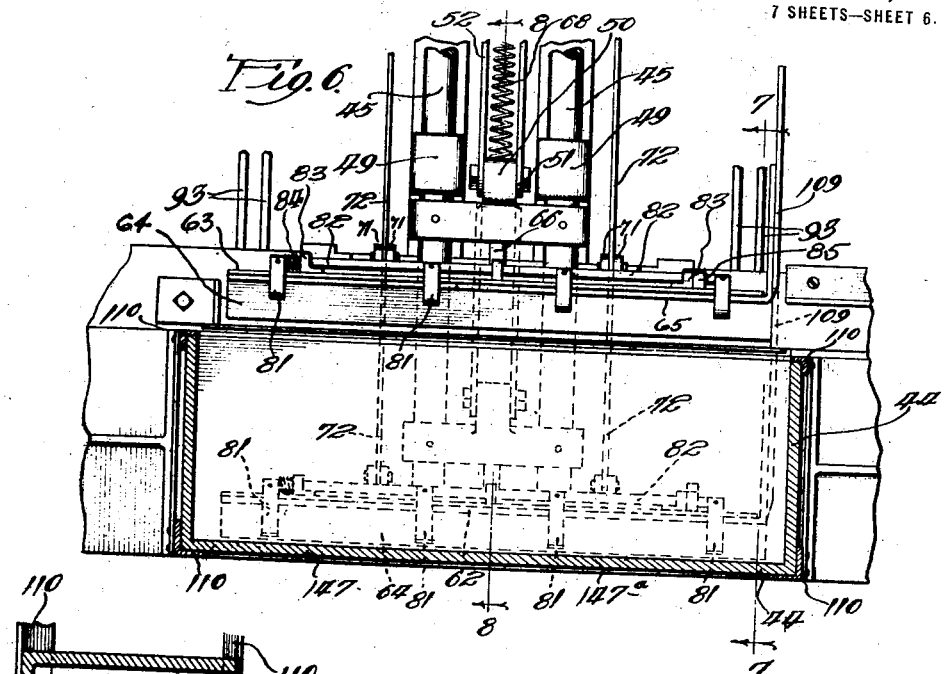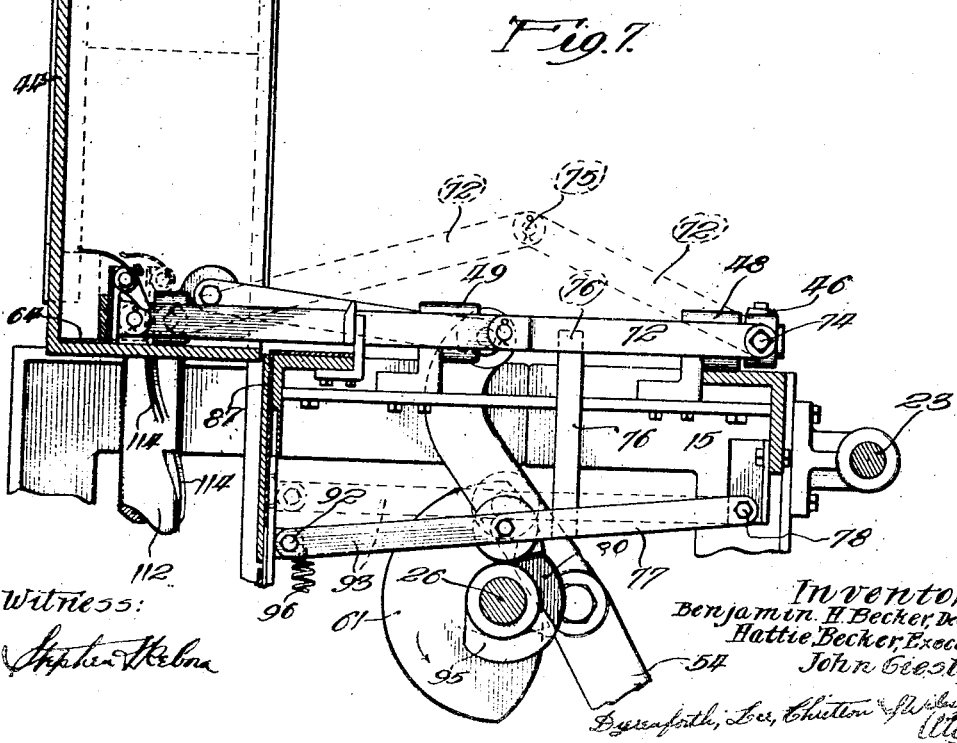

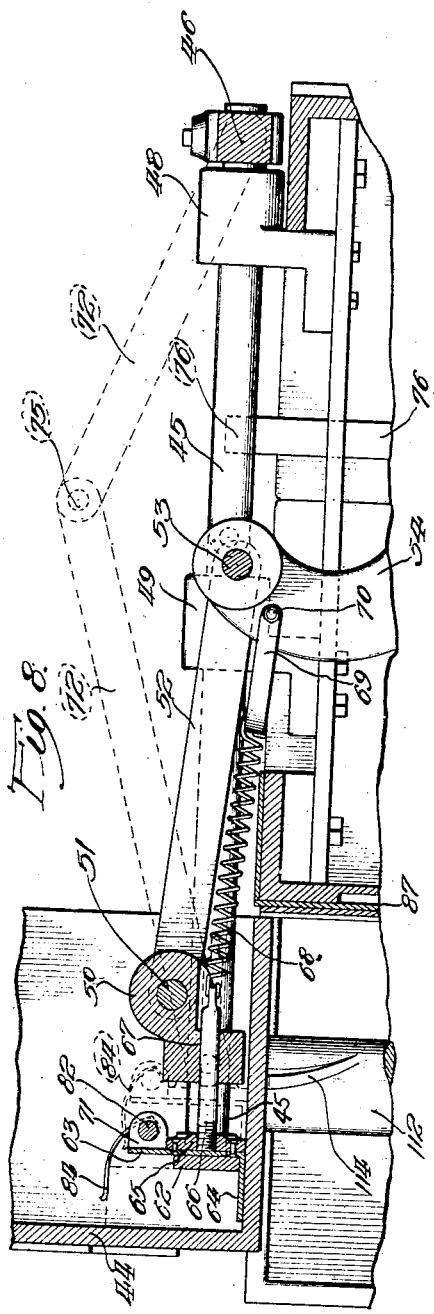

UNITED STATES PATENT OFFICE.

BENJAMIN H. BECKER, DECEASED, LATE OF CHICAGO, ILLINOIS, BY HATTIE BECKER, EXECUTRIX, OF CHICAGO, ILLINOIS, AND JOHN CIESLA, OF CHICAGO, ILLINOIS.

SOAP-PACKING MACHINE.

1,367,852.     Specification of Letters Patent.     Patented Feb. 8, 1921.

Application filed April 21, 1920. Serial No. 375,583.

*To all whom it may concern:*

Be it known that BENJAMIN H. BECKER, deceased, formerly a citizen of the United States, lately residing at Chicago, Illinois, HATTIE BECKER, executrix, and JOHN CIESLA, residents of Chicago, Illinois, have invented new and useful Improvements in Soap-Packing Machines, of which the following is a specification.

The invention relates more particularly to the packing of bars of soap, preferably wrapped, in the boxes in which they are to be shipped or stored; and the primary objects are to provide a novel, simple and positively-operating machine for performing the packing of the soap by an automatic operation and which machine shall be economical of manufacture and operation.

Referring to the accompanying drawings:—

Figure 1 is a plan view of a machine constructed in accordance with our invention, a portion of the feeding means for the bars of soap being broken away. Fig. 2 is a view in elevation of the machine. Fig. 3 is an enlarged section taken at the line 3—3 on Fig. 1 and viewed in the direction of the arrows. Fig. 4 is an enlarged section taken at the line 4—4 on Fig. 1 and viewed in the direction of the arrows. Fig. 5 is a broken view in sectional elevation taken at the line 5—5 on Fig. 3 and viewed in the direction of the arrows. Fig. 6 is a plan sectional view of a part of the machine taken at the line 6—6 on Fig. 3 and viewed in the direction of the arrows, this view showing a box into which the soap is to be packed, and in coöperating relation thereto, the mechanism for introducing a row of bars into the box, and in dotted lines the position it assumes at the end of the movement thereof for introducing a row of bars of soap into the box and forming the rearmost series. Fig. 7 is a section taken at the line 7—7 on Fig. 6 and viewed in the direction of the arrows, the mechanism for feeding the bars of soap into the box being shown by full lines in the position in which it is shown by dotted lines in Fig. 6, certain portions of this mechanism being shown by dotted lines in a position occupied thereby, following the feeding operation referred to. Fig. 8 is a section taken at the line 8—8 on Fig. 6 and viewed in the direction of the arrows showing the parts in the position shown in Fig. 7. Fig. 9 is a section taken at the line 9—9 on Fig. 4 and viewed in the direction of the arrows; and Fig. 10, a view in elevation of the parts shown in Fig. 9.

As a preface to the following detailed description of the illustrated mechanism, it may be stated that in the particular construction illustrated, provision is made for feeding in alined formation, the bars of soap to be packed and also feeding the box into which the soap is to be packed, into a position for receiving the bars. The bars of soap presented opposite the open side of an uprightly-extending box to be filled, are automatically pushed in rows into the box by a series of separate operations, to cause a layer of the bars to extend into the box, a layer in the particular arrangement shown consisting of twenty bars on edge arranged in five rows of four bars each. As soon as such a layer has been produced, the box is automatically lowered a distance substantially equal to the height of the bars of soap, and another layer of bars introduced into the box, these operations continuing until the box has been filled, the box, each time a layer of bars has been produced in the box, lowering part way as stated.

In the particular construction of the machine illustrated, the frame of the machine is represented at 15, this frame being preferably of open-work structure as shown. The frame 15 is provided with a horizontally-extending extension 16 with which an endless conveyer belt 17 is associated, this belt extending at its upper portion above the extension 16 and below the latter at its lower portion. The belt 17 is supported at its opposite ends on pulleys, one only of which is shown at 18, to extend lengthwise of the machine and of the extension 16, the pulley 18 being rigidly secured to a shaft 19 journaled in bearings 20 on the frame of the machine, shaft 19 carrying a bevel-gear 21 meshing with a bevel gear 22 rigidly secured to a shaft 23 journaled in bearings 24 and 25 on the frame 15, the shaft 23 being operatively connected, to drive it, with a main drive shaft 26, as through the medium of sprocket-and-chain mechanism comprising sprockets 27 and 28 fixed on the shafts 23 and 26, respectively, and a sprocket chain 29 engaging these sprockets. The shaft 26 is journaled in bearings 30 on the frame 15 and is driven by any suitable power, as through the medium of the belt pulley 31. The conveyer belt 17 is continuously driven in the direction of the arrow in Fig. 1 and is adapted to receive and support in alined condition on its upper stretch, the bars of soap, represented at 32, preferably wrapped and delivered to this belt in any suitable manner, and preferably in end to end abutting relation. The extension 16 is provided throughout a portion of its length with upwardly-extending bars 33 which extend lengthwise of the machine and above the conveyer 17, these bars being spaced apart a distance slightly greater than the thickness of a bar of soap, and forming guides through which the soap bars are conveyed. A portion of the guide for the soap bars is formed of a bar section 34 hingedly connected at 35 with one of the bars 33, and a spring section 36 in the form of a bar, secured to the other bar 33 thereby providing a section of the guide for the soap bars, adapted to be laterally deflected, for the purpose hereinafter explained, the bar 34 being provided with an arm 37 shown as of angle shape which normally, under the action of a coil spring 38, abuts at its outer end against a bearing-support 39, the bar 34 in such position alining with the bar 33 with which it is hingedly connected; and the bar 36 under its spring action bearing against a sprocket chain hereinafter referred to. The member 16 also carries a bar 40 which extends in line with the bar 34 forming a continuation of the bar-guide at one side thereof, one end of the bar 40 being provided with a surface 41 extending at right angles thereto and adjacent to which the outer end of the bar 34 swings. The bar 40 is opposed by a bar section 42 forming therewith a portion of the guide for the bars of soap, and intermediate the bar portion 42 and the bar 36 is the sprocket chain hereinbefore referred to as coöperating with the end of the bar 36, to complete the guide surface at this side of the guide, the structure just described serving to guide the bars of soap up to the pusher mechanism, hereinafter described, and provided for introducing the bars of soap in the box. It will be understood that the conveyer 17 operates to move the bars of soap through the guide-way thus provided to the left in Fig. 1, there being provided for coöperation with the conveyer and to insure the proper feeding of the bars into a position to be acted upon by the pusher mechanism, auxiliary feed mechanism of which the sprocket chain last referred to is a part and which is hereinafter described.

The frame of the machine presents, in line with the upper portion of the conveyer belt 17, a plate section 43 along which the bars of soap are conveyed, this plate-section being located in the same horizontal plane as the portion of the pusher mechanism hereinafter described, upon which the bars of soap rest, is located.

At the rear side of the frame 15 is provided a box-feeding mechanism with which is associated a box magazine for receiving boxes in superposed relation and through which the boxes move under the action of the said box-feeding mechanism hereinafter described, in a path parallel with the direction of travel of the conveyer belt 17. In other words, the boxes, one of which is represented at 44 (Figs. 6 and 7), the box being omitted in the other figures, are fed downwardly in succession in a plane parallel with the edge of the belt 17, with their open sides arranged opposite the bars of soap delivered by the conveyer mechanism described to the pusher mechanism, in order that these bars may be pushed into the box, as by the following described mechanism.

The pusher mechanism referred to comprises a pair of rods 45 spaced apart and extending parallel with each other, these rods being connected together at their rear ends by a cross-piece 46, and at their forward ends by a cross-piece 47, the rods 45 which extend substantially horizontally and at a right angle to the guide-way for the bars of soap hereinbefore explained, are slidably mounted in bearings 48 and 49 secured to, and rising from the frame 15 of the machine. The cross-piece 47 is equipped with a rearwardly-extending ear 50 containing a pivot pin 51 to the ends of which, the forward ends of links 52 are connected, the rear ends of these links engaging a pivot pin 53 provided in the upper end of a rocker arm 54 rigidly secured to a shaft 55 journaled in a bearing 56 on the frame 15, the lever 54 being provided intermediate its ends with a laterally-extending roller 57 for a purpose hereinafter explained. The shaft 55 is provided with an arm 58 which is connected at its outer end with the upper end of a spring 59, the lower end of the latter being rigidly connected, as indicated at 60, to the frame 15 of the machine, the spring 59 affording a means whereby the pusher mechanism now being described, is yieldingly forced into delivering position, viz., to the right in Fig. 3 for the purpose of introducing into the box, the bars of soap to be packed therein. The lever 54 coöperates at its roller 57 with a cam 61 rigidly secured on the shaft 26 and preferably of the shape shown and under the control of the operation of which the pusher mechanism is caused to reciprocate to perform the soap-delivering operation, as hereinafter described. The forward ends of the rods 45 carry a plate 62 which extends crosswise thereof, and coöperating therewith is a holder for soap-bars, shown as formed of an angle plate presenting the upwardly-extending flange 63 and the horizontal, and forwardly-extending, flange 64, the plate 62 being located in front of the flange 63 and above the flange 64, the flange 63 being backed by a plate 65. The rods 45 extend guidingly through apertures in the plate 65 and the flange 63, thereby permitting relative movement of the plate 65 and the angle plate referred to, in a direction lengthwise of these rods and relative to the plate 62. The plate 65 is provided with a rearwardly-extending rod 66 which guidingly extends through an opening 67 in the cross-piece 47, the rear end of this rod being connected with one end of a spring 68 the other end of which is connected with the cross-piece of a yoke 69 pivotally connected, as indicated at 70, to the upper end of the arm 54, this spring operating to yieldingly shift the angle plate of the holder and the plate 65 connected therewith, to the right in Fig. 8 to the dotted position shown in this figure. The plate 65 is provided toward its opposite ends with pairs of ears 71 spaced apart and at which the forward ends of toggle levers 72 are pivotally connected at 73, these toggle levers being pivotally connected at their rear ends to the cross-piece 46, as indicated at 74, the intermediate joints of the elements forming these toggles being indicated at 75. The relationship of the parts just described, is such that when the toggles 72 are in the position shown in Figs. 3, 4 and 5 and in full lines in Fig. 7, the angle plate 63—64 will occupy the position relative to the plate 62 as shown by full lines in Fig. 7 and the joints 75 of the toggles will extend slightly below lines connecting the pivots 73 and 74, the parts being held in this position by the action of the spring 68.

It may be here stated as a preface to further description of the machine, that the pusher mechanism in its extreme withdrawn position from the box, viz., that illustrated in Figs. 1 to 4 inclusive, and by full lines in Fig. 6, presents its holder member referred to, substantially in line with the path through which the bars of soap are conveyed, four of the bars, each time the pusher mechanism is retracted, being pushed onto the portion 64 of the holder mechanism on which they are carried into the box to pack them therein, by the forward movement of the pusher mechanism under the action of the spring 59, the bars being discharged from the holder mechanism, in the box to the position to which they were delivered, by withdrawing from beneath them the supporting plate portion 64, while permitting the plate 62 to remain stationary, this being effected by causing the toggles 72 to be upwardly deflected at their jointed portion 75 at the proper time thereby permitting the spring 68 to draw the angle-plate and the plate 65 of the holder rearwardly. The mechanism for thus operating the toggles comprises upwardly-extending push-bars 76 extending immediately below the toggles and carried by levers 77 intermediate the ends of the latter, these levers being pivotally connected at their rear ends to the frame of the machine at 78, and equipped at their forward ends with rollers 79 which extend into the path of movement of cams 80 secured to the shaft 26, these cams when moving into engagement with the rollers 79, lifting the arms 77 and rods 76 to the dotted position shown in Fig. 7 and in such movement upwardly breaking the toggles as stated.

The holder mechanism of the pusher means is provided with means for holding the bars of soap against displacement on the holder mechanism during the operation thereof, these means comprising a series of spring fingers 81 rigidly secured to extend in a forward direction and in a position directly over the plate portion 64, on a rock shaft 82 journaled in bearings 83 extending rearwardly from the plate 65, the shaft 82 being provided with a coiled torsion spring 84 surrounding it and attached at one end to one of the bearings 83 and at its opposite end to the shaft 82, this spring tending to rock the shaft 82 in anti-clockwise direction in Fig. 7 for pressing the fingers 81 against the upper surfaces of the bars 32 of soap, there being provided one finger for each bar. The shaft 82 is provided with an arm 85 which, in the final movement of the pusher mechanism in withdrawing from the box, viz., to the position shown by full lines in Fig. 6, engages one of two stationary lugs 86 provided on the frame 15 and rocks the shaft 82 to a position in which the fingers 81 are raised as indicated in Fig. 3, these fingers immediately depressing against the bars of soap in the holder, upon the initial forward movement of the pusher mechanism.

It may be here stated that the lug 86 referred to as operating the shaft 82, performs another function, in combination with the other one of the lugs 86, viz., that of causing the angle member of the holder to assume the position, relative to the plate 62 as shown by full lines in Figs. 7 and 8, at the end of the movement of the pusher mechanism in withdrawing from the box, thereby to position these parts for receiving another row of bars of soap for introduction into the box, this result being brought about by reason of the engagement of the bar 65 with the lugs 86 shortly before the rods 45 have been shifted to the extreme position to the right in Figs. 7 and 8, whereby the angle plate presenting the portions 63 and 64 and the plate 65 are held against movement with the rods 45 with the result of the toggles 72 dropping to normal position (Figs. 3 and 4) in which position they remain, under the action of the spring 68 in the forward-delivering operation of the pusher mechanism until these toggles are engaged by the push bar mechanism hereinbefore described for breaking them.

In the retracted position of the pusher mechanism in which the bars of soap to be delivered thereby into the box are fed to the pusher mechanism, means are provided for preventing displacement laterally of the soap and guiding it to position on this mechanism, these means being in the form of a plate 87 which is mounted to move vertically in a guide slot 88 in a stationary part of the machine-frame, this plate, which extends parallel with the holder member of the pusher mechanism and is of slightly greater length, being so located as to extend in front of the holder mechanism, when the pusher mechanism is fully retracted, and substantially in line with the guide wall 40 for the bars of soap. The plate or slide 87 is backed by a plate 89 having depending portions 90 at its opposite edges, presenting lugs 91 which are pivotally connected at 92 with the forward ends of pairs of levers 93, one pair being provided at each side of the machine. The pairs of levers 93 are pivotally connected at their rear ends with the pivot 78 and between their ends are equipped with rollers 94 which coöperate with cams 95 rigid on the shaft 26, these cams operating, during a portion of the revolution of the shaft 26 in the direction of the arrow in Fig. 3, to raise the plate 87 against the action of springs 96 connected with the levers 93 and the frame of the machine, and hold it in raised position until the pusher mechanism is about to move forwardly to deliver bars of soap into the box.

Reference has been hereinbefore made to a sprocket chain one portion of which forms a part of the guide-way through which the bars of soap pass to the pusher mechanism. The sprocket chain referred to is represented at 97 and is shown as extending over sprockets 98 fixed on shafts 99 journaled at their upper and lower ends in bearings 100 and 101 carried by the auxiliary frame structure 39 rigidly secured to the frame of the machine, one of the links of the chain 97 being equipped with a laterally-extending lug 103 in which a horizontally disposed roller 104 is journaled on a vertical axis, as indicated at 105, this roller throughout a portion of the movement of the chain 97 extending into the guide-way for the bars of soap. One of the shafts 99 has secured to it at its lower end, a bevel-gear 106 which meshes with a bevel-gear 107 fixed on the shaft 19. The gear connections between the shaft 26 and the shaft 99 last referred to are such that with each complete revolution of the shaft 26 the sprocket chain 97 will travel a distance equal to its length, and the pulley 18 is preferably of such diameter that the belt 17 will travel at such a speed that the bars of soap will never lack the speed of travel, through the medium of this belt 17, sufficient, in connection with the auxiliary bar advancing mechanism of which the roller 104 is a part, to insure the filling of the holder with the desired number of bars preliminary to each operation of the pusher mechanism for delivering the bars of soap into the box. The function of the sprocket chain 97 and roller 104 is that of engaging the ends of the bars in the guide-way on the machine, and forcing them into the holder of the pusher mechanism, this function being performed by the roller 104, as it is carried by the chain 97 around the sprocket 98 at the right hand side of Fig. 1, engaging the spring section 36 of the guide and forcing it away from the chain 96, together with the bars of soap opposing this part of the guide, and also the plate 34, and in its continued movement bearing against the end of the bar of soap directly beyond the guide portions 34 and 36, this roller in the continued movement of the sprocket chain 97 thereby positively forcing through the guide-way, by movement to the left in Fig. 1, all of the bars of soap in front of this roller, viz., six bars of soap in the particular construction illustrated, and by the time the roller has completed its movement through the guide, it will have moved the bars in front of it a distance equal to substantially four times the length of a bar thus pushing four bars into the holder of the pusher mechanism. It may be here stated that the frame of the machine is provided at the left hand side thereof in Fig. 1, with an upwardly-extending stop 108 to prevent the movement of the bars along the holder beyond the point at which it is desired they be positioned thereon, and, as a means for positively preventing the movement of bars of soap through the guide into a position in which they would interfere with the operation of the machine, the plate 62 is provided with a rearwardly-extending plate portion 109 which is projected across the guide-way for the bars of soap, as soon as the pusher mechanism starts on its forward stroke (Fig. 6).

Referring further to the magazine for the boxes, the magazine as shown is formed of uprights 110 shown as of angle form in cross-section and rising from the frame of the machine, these angle irons being so set as to present guides to hold the boxes introduced therein one above the other, to a straight line, the boxes being introduced into the magazine referred to in position to cause their open sides, to oppose the pusher mechanism as the boxes are successively moved into opposed position relative thereto.

The boxes in the magazine are supported from the lowermost one thereof, on box-feeding mechanism hereinbefore referred to and which, in the particular construction of the machine illustrated, comprises a pair of vertically disposed shafts 112 journaled in bearings 113 on the frame, to extend in parallel relation at the opposite sides of the box magazine, these shafts being spaced apart at their opposed faces, a distance slightly greater than the length of a box, so that the boxes may move through the space between these shafts. Each of these shafts is provided on its periphery with lugs 114 disposed in a spiral series as shown, in the particular construction illustrated each series forming slightly less than one complete turn of a spiral. The lugs 114 are preferably constructed as shown to afford the upper box-seating and supporting surfaces 115 from which extend the inclined surfaces 116 for a purpose hereinafter explained, the surfaces 115 forming supports for the boxes during the positioning of a layer of bars of soap in the box, and the box being lowered from one lug to another. The shaft 112 at the left hand side in Fig. 1 rotates in clockwise direction and the shaft 112 at the right hand side of Fig. 1 operates in anti-clockwise direction, the series of lugs 114 being so formed that, assuming the box to be resting on the uppermost lugs 114 of these shafts 112, they will be withdrawn simultaneously from engagement with the bottom of the box and permit it to slide down the inclined surfaces 116 thereof to the next lowermost lugs 114 on both of these shafts, a distance equal to substantially the width of a bar of soap, the box thereupon becoming seated on these next uppermost lugs.

The box-feeding mechanism coöperates with driving mechanism therefore operating to cause these shafts to move sufficiently far to discharge a box from the lugs on the shafts 112 at one elevation to the next uppermost lugs thereon, following the introduction into the box of a layer of the bars, in the particular construction illustrated, as hereinbefore stated, a layer comprising sixteen bars of soap and which involves five complete reciprocations of the pusher mechanism referred to, a description of the mechanism for thus operating the shafts, being as follows: The shafts 112 are provided at their lower ends with bevel-gears 117, which mesh with bevel-gears 118 secured on a shaft 119 extending lengthwise of the machine, this shaft being journaled in the frame of the machine and provided at its outer end with a collar 120 at which it extends beyond the frame of the machine. Journaled on the shaft 119 is a bell-crank lever 121, one arm of which is pivotally connected at 122 with the lower end of a bar 123, the upper end of which is journaled at 124 on a crank 125 rigid on the shaft 26, the other arm 126 of the bell-crank carrying a pawl 127 pivotally connected therewith at 128, this pawl being adapted to coöperate with a ratchet disk 129 journaled on the shaft 119 and provided, in the particular arrangement shown, with five ratchet teeth 130 with which the pawl 127 coöperates.

The ratchet disk 129 on its inner face is provided with a pawl 131 pivotally connected therewith through the medium of a pin 132, the tooth 133 of this pawl being adapted to coöperate with a ratchet 134 keyed, as indicated at 135, to the shaft 119, the teeth on this pawl, as shown five in number, being represented at 134ª. The pawl 131 is provided with a roller 136 extending laterally therefrom adapted, under the action of a spring 137 secured at one end to the ratchet 129 and at its free end engaging the pawl 131, to coöperate with a member 138 in the form of a plate, having a recessed portion 140 bounded by shoulders 141 and 142, the member 138 surrounding the shaft 119, and being rigidly secured to the frame of the machine as by the screw 143. It will be understood from the foregoing that when the shaft 26 is rotated in the direction of the arrow in Fig. 4, it will oscillate the bell-crank 121 to effect, through the medium of the pawl 127, coöperating with the shoulders 130, an intermittent movement of the ratchet 129 in anti-clockwise direction in Fig. 4, this ratchet being rotated one-fifth of a revolution with each complete oscillation of the bell-crank lever 126 and rotation of the shaft 26. The effect of rotating the ratchet 129 is to cause the pawl 131 to ride at its roller 136 upon the circular periphery of the disk 138, the parts being so proportioned that the tooth 133 of this pawl will be held in a position in which it does not engage the teeth 134ª, but as soon as the roller 136 moves, with the ratchet 129, to a position in which it opposes the inset surface 140 of the plate 134, the pawl 131 is free to engage one of the teeth 134ª of the ratchet 134, this pawl being held in engagement with such tooth until the roller strikes the shoulder 142 and lifts the pawl 131 out of engagement with said shoulder, the ratchet 134 being moved one-fifth of a revolution upon such movement of the pawl, or in other words the ratchet 134 is moved one-fifth of a revolution for each revolution of the ratchet 129. In order that the ratchet 129 may be prevented from having retrograde movement, a pawl 144 is pivoted at 145 on the frame of the machine and is yieldingly held in the path of movement of the ratchet teeth 130, by a spring 146 secured to the pawl 144 and to a stationary part of the machine.

The operation of the machine is as follows: Assuming the box magazine to contain boxes arranged in superposed relation, with the sides of the boxes abutting and with their open sides facing to the right in Figs. 4, 7 and 8, and the parts of the machine to be in the positions illustrated in Figs. 1 to 6 inclusive and 9 and 10, wherein a box, represented at 44 is shown in the position for receiving the first layer of soap bars and in such position is supported on the uppermost lug 114 of each of the box-feeding shafts 112, and the auxiliary soap-bar moving mechanism, is in the position shown in Fig. 1, in which position it is advancing, through the soap-guide six bars of soap, shown by dotted lines at 32, by engagement with the last one of the six, two of the bars having moved onto the holder device of the pusher mechanism, the continued rotation of the shaft 26, being driven by the belt pulley 31, continues to drive the auxiliary bar-feeding mechanism as stated, to a position in which four bars of soap are introduced into the holder of the pusher mechanism in alined position therein and directly in front of the open side of the box, the conveyer belt 17 in its continuous rotation, this belt being driven at a slower speed than the chain 97, operating to advance the line of soap bars which are in the rear of the roller 104, into engagement with the one of the soap bars which was engaged by this roller to advance the six bars, as before stated, this operation being effected before the roller 104 has passed around the sprocket 98 at the right hand side of Fig. 1.

Immediately following the charging of the holder device of the pusher mechanism, as stated, the continued rotation of the shaft 26 causes the cams 95 to be withdrawn from the rollers 94, with the result of permitting the levers 93 to be drawn down by the spring 96 thus lowering the slide 87 to the position illustrated in Figs. 7 and 8, and immediately thereafter the lower portion of the cam 61 moves into engagement with the roller 57 thereby permitting the spring 59, through the medium of the arm 58, shaft 55 and lever 54, to move the pusher mechanism to the right in Fig. 3. The effect first produced by this movement of the pusher mechanism, is to permit the torsion spring 84, by reason of the movement of the plate 65, and consequently the arm 85, away from the stops 86, to rotate the shaft 82 in clockwise direction in Fig. 3 thereby turning the spring arms 81 down against the tops of the bars to thereby hold them against accidental displacement on the holder. The pusher mechanism, continuing its movement to the right in Fig. 3 carries the row of soap bars (viz., four in the row) into the box 44 to a position in which they extend adjacent the rear wall 147ᵃ of the box as shown by dotted lines in Fig. 6 and by full lines in Figs. 7 and 8. During the final movement of the pusher mechanism to the position just recited, the cams 80 engage the levers 77 and lift the pusher bars 76 thereby, through their engagement with the toggles 72, causing the latter to break upwardly to the dotted position shown in Figs. 7 and 8, with the result of permitting the springs 68, through its connection with the rod 66, to quickly shift the parts directly connected with the latter, and of which the plate portions 63 and 64 are parts, to the right in Figs. 7 and 8, to the dotted position therein shown, thereby withdrawing the support from beneath the bars in the box, whereupon these bars become supported on the box wall beneath them. The continued rotation of the shaft 26 causes the cam 61, acting against the roller 57, to rock the lever 54 in a direction for moving the pusher mechanism to the right in Figs. 7 and 8, the parts of the pusher mechanism, in the positions they assume upon the release of the bars of soap from the holder portion thereof, as described, remaining in this position, until the arm 85 strikes the one of the lugs 86 with which it coöperates, and the plate 65 strikes these lugs which prevents the plate 65 and the parts carried thereby from further moving to the right in Figs. 7 and 8, the other parts of the pusher mechanism continuing their movement in this direction, however, with the result of causing the toggles 72 to become straightened out, in opposition to the action of the spring 68, and assume the normal position shown in Figs. 3 and 4, and by full lines in Fig. 7, the plate 62 thus being drawn to the position, relative to the plate 63, as shown in Fig. 3 and the bar-gripper mechanism of which the spring-arms 81 are parts, assuming the raised position shown in Fig. 3, it being understood that the pusher bars 76 preliminary to the restoration of the toggles, to normal position, are lowered to the position shown in Fig. 3. Following the withdrawal of the pusher mechanism to the position shown in Fig. 3, the cams 95, in the continued rotation of the shaft 26 operate against the rollers 94 to raise the plate 87 to the position shown in Fig. 3, for the purpose hereinbefore stated.

Following the retraction of the pusher mechanism to the position shown in Fig. 3, the roller mechanism 104 is moved, by the travel of the sprocket chain in the direction of the arrow in Fig. 1, against the deflectable portions of the soap-bar guide and into a position in the rear of the last one of these bars of soap lined up in the guide-way adjacent the pusher mechanism, and in the continued movement of the chain 97 the first four of these six bars are pushed into the holder of the pusher mechanism as hereinbefore explained, and the hereinbefore described operations of the pusher mechanism, the slide 87 having been preliminarily lowered automatically, are repeated to insert into the box another series of four bars to extend against the series of four bars introduced into the box as hereinbefore described. In this operation the pusher mechanism actuated by the spring 59 does not enter the box as far as it did in the first-described operation, inasmuch as the first row of bars of soap is in the path of movement of the second row, the parts operating, however, in the same way as hereinbefore described, but there being an interval between the time when the presser mechanism discontinues its inward movement into the box and the time when the stripping of the bars from the holder and the release of the clamps 81, is effected. The series of operations hereinbefore explained are repeated, to introduce into the box five rows of bars of soap, and following this operation, and the withdrawal of the pusher mechanism from the path of vertical movement of the bòx in the feeding operation of the latter, the box into which the single layer of bars has been introduced as stated, is lowered from the uppermost lug on each of the shafts 112, to, and upon, the next uppermost lug 114 on each of these shafts, which lowers the said layer of bars below the plane in which the holder device of the pusher mechanism operates, this lowering of the box being accomplished by reason of the fact that as soon as the pusher mechanism has been retracted from the box, after the five rows of the first layer have been introduced therein, the roller 136 drops off the shouldered part 141 of the member 138 thereby permitting the pawl 131 to engage one of the teeth 134ª and rotate the ratchet 134 one-fifth of a revolution. At the conclusion of the box-feeding movement as stated, the operations of introducing five rows of bars of soap into the box to form a second layer therein, as hereinbefore explained, is repeated, and thereafter the box-feeding mechanism again operates to lower the box a distance equal to substantially the width of a bar of soap, and another layer of bars of soap introduced into the box as stated, these various operations continuing, until five layers of soap bars of twenty bars each, have been charged into the box in superposed relation, whereupon the box thus filled, discharges from the box-feeding mechanism and is removed from the machine in any desirable manner, as for example by tilting it away from the machine to cause its open side to be uppermost as for example to position it on a conveyer (not shown). It will be understood that upon the discharge of a filled box from the box-feeding mechanism, as stated, the box next above it will become positioned on the uppermost ones of the lugs 114 in position to have the first layer of rows introduced into it by the operations hereinbefore explained.

While we have illustrated and described a particular construction of machine embodying our invention, we do not wish to be understood as intending to limit it thereto as the same may be variously modified and altered without departing from the spirit of the invention.

Claims.

1. In a machine of the character set forth, the combination of means for introducing the articles into a box and including a support for the articles, and means adapted to be moved into and out of engagement with the upper surfaces of the article for preventing accidental displacement of the articles on said support.

2. In a machine of the character set forth, the combination of means for introducing the articles into a box and including a support for the articles, a resilient member adapted to yieldingly bear against the upper surface of the article for preventing accidental displacement of the latter on said support, and means operating automatically to cause said member to be in a position in which the movement of the article to the support will not be obstructed by the member, when said first-named means is positioned for receiving the articles.

3. In a machine of the character set forth, the combination of means for introducing the articles into a box and including a support for the articles, and a rock-member carrying a resilient device adapted in one position of said rock-member to bear against the upper surface of the article for preventing accidental displacement of the latter on said support.

4. In a machine of the character set forth, the combination of means for introducing the articles into a box and including a support for the articles, a rock-member carrying a resilient device adapted in one position of said rock-member to bear against the upper surface of the article for preventing accidental displacement of the latter on said support, and means operating automatically to rock said lever to a position in which the said device thereon does not obstruct the movement of the article to said support, in the position of said first-named means for receiving the articles.

5. In a machine of the character set forth, the combination of a reciprocating member provided with a support for receiving articles to be introduced into a box upon the movement of said member in one direction, a member adapted to coöperate with the upper surface of the article for preventing accidental displacement thereof on said support, and movable into and out of such position, and means, operating automatically, to cause said second named member to be in a position in which it does not obstruct the movement of the article to said support, in the withdrawn position of said support.

6. In a machine of the character set forth, the combination of means for introducing articles into a box to extend in superposed layers therein, a box-supporting-and-lowering means formed of series of projections arranged in different positions vertically, and means whereby the box is caused to be lowered in succession from one projection to another, to cause the box to extend in different planes.

7. In a machine of the character set forth, the combination of means for introducing articles into a box to extend in superposed layers therein, a box-supporting-and-lowering means formed of series of projections arranged in different positions vertically, and means whereby the box is caused to be lowered in succession from one projection to another, to cause the box to extend in different planes, said last-named means operating automatically and in timed relation to said first-named means for lowering the box other than during the feeding of articles thereto.

8. In a machine of the character set forth, the combination of means for introducing articles into a box to extend in superposed layers therein, and box-supporting-and-lowering means formed of revoluble members provided with laterally extending projections arranged generally in spiral formation and operating, in the rotation of said members, to lower the box from one of said projections to another on each of said revoluble members.

9. In a machine of the character set forth, the combination of means for introducing articles into a box to extend in superposed layers therein, and box-supporting-and-lowering means formed of revoluble members provided with laterally extending projections arranged generally in spiral formation and operating, in the rotation of said members, to lower the box from one of said projections to another on each of said revoluble members, said revoluble members being formed with inclined surfaces along which the box moves in lowering as stated.

10. In a machine of the character set forth, the combination of means for introducing articles into a box to extend in superposed layers therein, box-supporting-and-lowering means formed of revoluble members provided with laterally extending projections arranged generally in spiral formation and operating, in the rotation of said members, to lower the box from one of said projections to another on each of said revoluble members, and means, operating automatically, in timed relation to said first-named means, to operate said revoluble members.

11. In a machine of the character set forth, the combination of means, operating automatically, to introduce into a box a plurality of rows of articles to form a plurality of layers of the articles in the box, each by a series of successive movements, a box supporting and lowering means formed of series of projections arranged in different positions vertically, and means whereby the box is caused to be lowered in succession from one projection to another, to cause the box to extend in different planes, said last-named means operating automatically and in timed relation to said first-named means to effect lowering of the box after a layer of articles has been introduced therein.

12. In a machine of the character set forth, the combination of reciprocating means for introducing articles delivered thereto, into a box, means for delivering articles to said reciprocating means, by an intermittent movement, and a plate member adapted to be moved into and out of a position in which it extends along a side of the articles delivered to said reciprocating means, and means, operating automatically, to cause said member to extend into a position along a side of the articles in said reciprocating means when the said last-named means are in withdrawn position, and to be withdrawn from such position in the feeding movement of said reciprocating means.

13. In a machine of the character set forth, the combination of reciprocating means for introducing articles delivered thereto, into a box, means for delivering articles to said reciprocating means, by an intermittent movement, a slidable plate member adapted to have movement up and down and be moved into and out of a position in which it extends along a side of the articles delivered to said reciprocating means, and means, operating automatically, to cause said member to extend into a position along a side of the articles in said reciprocating means when the said last-named means are in withdrawn position, and to be withdrawn from such position in the feeding movement of said reciprocating means.

14. In a machine of the character set forth, the combination of reciprocating means for introducing articles into a box, means for delivering articles to said reciprocating means, by an intermittent action, a plate member adapted to be moved into and out of a position in which it extends along a side of the articles in said reciprocating means, and movable out of such position, means operating to actuate said member, and means whereby all of the hereinbefore mentioned means, operate in predetermined timed relation to each other.

15. In a machine of the character set forth, the combination of means for introducing into a receptacle articles delivered to said means, a movable support upon which the articles to be conveyed and delivered to said means are supported, means for actuating said support, and means operating to intermittently engage the row of said articles on said support and advance a predetermined number of the articles in the direction of their movement by said support to said first-named means.

16. In a machine of the character set forth, the combination of means for introducing into a receptacle articles delivered to said means, a movable support upon which the articles to be conveyed and delivered to said means are supported, means for actuating said support, and means operating to intermittently engage the row of said articles on said support and advance on said support during its movement a predetermined number of the articles to said first-named means.

17. In a machine of the character set forth, the combination of means for introducing into a receptacle articles delivered to said means, a movable support upon which the articles to be conveyed and delivered to said means are supported, means for actuating said support, and means, including an endless traveling member with a projection thereon, operating to intermittently engage the row of said articles on said support and advance a predetermined number of the articles to said first-named means.

18. In a machine of the character set forth, the combination of means for introducing into a receptacle articles delivered to said means, a movable support upon which the articles to be conveyed and delivered to said means are supported, said support being formed with guide walls having a deflectable portion, and means located adjacent said guide walls and adapted in their movement to engage the rear surface of one of the articles, by deflecting the following article, and advance along said support, to said first-named means, the articles extending in front of said last-named means.

19. In a machine of the character set forth, the combination of means for introducing into a receptacle articles delivered to said means, a movable support upon which the articles to be conveyed and delivered to said means are supported, means for moving said support, said support being formed with guide walls having a deflectable portion, and means located adjacent said guide-walls and adapted in their movement to engage the rear surface of one of the articles, by deflecting the following article, and advance along said support, to said first-named means during the movement of said support, the articles extending in front of said last-named means.

20. In a machine of the character set forth, the combination of means for introducing into a receptacle articles delivered to said means, a movable support upon which the articles to be conveyed and delivered to said means are supported, said support being formed with guide walls having a deflectable portion, and means for moving the articles including an endless traveling member, means for actuating said member, and a projection on said member, said projection operating in the movement of said member, to engage the rear surface of one of the articles, by deflecting the following article, and advance along said support, to said first-named means, the articles extending in front of said projection.

21. In a machine of the character set forth, the combination of means for introducing into a receptacle articles delivered to said means, a movable support upon which the articles to be conveyed and delivered to said means are supported, said support being formed with guide walls each of which is formed between its ends with a deflectable portion, and means for moving the articles along said support to said first-named means adapted to engage one of said deflectable portions, thereby laterally displacing the article located between said deflectable portions, and extending into engagement with the rear surface of the one of the articles in advance of said deflectable portion for the purpose set forth.

22. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member, and means operating to effect relative movement of said members for disengaging the article from said second member.

23. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, and means for reciprocating said second member and operating to effect movement of said second member relative to said first-named member in a direction to withdraw said second member from beneath the article while the latter is engaged by said first-named member, in the movement of said article-delivering means.

24. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member, one of said means being formed with a toggle portion and spring means coöperating therewith, whereby when the toggle is broken relative movement of said members occurs to effect disengagement of the article from said second member, and means for breaking said toggle portion.

25. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member and including a toggle portion and a spring operating to move said second member relative to said first member when said toggle is broken to effect movement of said second member relative to said first-named member in a direction to withdraw said second member from beneath the article while the latter is engaged by said first-named member in the movement of said article-delivering means, and means for breaking said toggle.

26. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member, means operating to effect relative movement of said members for disengaging the article from said second member, and means for causing said members to assume positions relative to each other, in the retracted position of said article-delivering means, wherein said second member is positioned to receive an article and said first-named member to extend in the rear of the article.

27. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means connecting said second member with said first-named member for reciprocating said second member from said first-named member, said means being formed with a toggle portion, a spring tending to break said toggle portion and to move said second member relative to said first-named member in a direction to withdraw said second member from beneath the article while the latter is engaged by said first-named member, and means, operating automatically, to break said toggle and permit said spring to operate as stated.

28. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means connecting said second member with said first-named member, said means being formed with a toggle portion, a spring tending to break said toggle portion and to move said second member relative to said first-named member in a direction to withdraw said second member from beneath the article while the latter is engaged by said first-named member, and means, operating automatically, to break said toggle and permit said spring to operate as stated in the movement of said article-delivering means.

29. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means connecting said second member with said first-named member for reciprocating said second member from said first-named member, said means being formed with a toggle portion, a spring tending to break said toggle portion and to move said second member relative to said first-named member in a direction to withdraw said second member from beneath the article while the latter is engaged by said first-named member, and pusher-rod mechanism operating to break said toggle portion.

30. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means connecting said second member with said first-named member for reciprocating said second member from said first-named member, said means being formed with a toggle portion, a spring tending to break said toggle portion and to move said second member relative to said first-named member in a direction to withdraw said second member from beneath the article while the latter is engaged by said first-named member, means, operating automatically, to break said toggle and permit said spring to operate as stated, and means whereby said toggle portion is restored to normal condition against the action of said spring to cause said members to assume a position in which said second member is adapted to support an article and said first-named member extends in the rear of said article.

31. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member, means operating to effect relative movement of said members for disengaging the article from said second member, and means on said second member for engaging the upper surface of the article thereon.

32. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means for reciprocating said second member, means operating to effect relative movement of said members for disengaging the article from said second member, means movable into and out of a position for engaging the upper surface of an article supported on said second member, means tending to move said last-named means into article-engaging position, and means for causing said members to assume positions relative to each other, in the retracted position of said article-delivering means, wherein said second member is positioned to receive an article and said first-named member to extend in the rear of the article and move said means engaging the upper surface of said article into a position in which it does not obstruct the positioning of an article on said second member.

33. In a machine of the character set forth, a support for a box into which articles are to be introduced to form a layer therein, means for introducing articles into the box to form the layer by a series of successive reciprocatory movements and involving a reciprocatory element which engages the articles and moves them into the box, and means for reciprocating said element and involving a yieldable portion, said means operating in moving the first article into the box, to deliver it adjacent the rear wall of the box and introduce the succeeding articles forming a layer, into the box against the previously introduced articles by reason of the action of said yieldable portion of said means.

34. In a machine of the character set forth, the combination of a support for a box into which articles are to be introduced to form a layer therein, a reciprocable element operating to introduce the articles into the box in succession to form the layer therein, yieldable means operating to move said element in a direction for introducing the articles into the box, and means operating to intermittently move said element in the opposite direction, said last-named means being constructed and arranged to permit said element to have restricted movement toward the box as resisted by articles previously introduced into the box by said element.

35. In a machine of the character set forth, the combination of a box-supporting-and-feeding device, means for introducing articles into a box supported on said device, means for operating said box-supporting-and-feeding device to lower said box in timed relation to the operation of said first-named means, and including a drive shaft, a driven shaft operatively connected with said device, pawl and ratchet mechanism operated by said drive shaft, a second pawl and ratchet device actuated by said first-referred-to pawl and ratchet device, the ratchet of said second pawl and ratchet mechanism being operatively connected with said driven shaft and adapted to be actuated by the pawl of said second pawl and ratchet device, and means operating to cause the pawl of said second pawl and ratchet device to be out of engagement with said second-referred-to ratchet, except during a portion of the movement of the pawl of said second pawl and ratchet device.

36. In a machine of the character set forth, the combination of means for introducing into a receptacle articles delivered to said means, means whereby a row of articles is caused to advance toward said first-named means, and means operating intermittently to move toward said first-named means, while the latter is not operating, and in the direction of movement of the articles by said second-named means, a predetermined number of the articles, less than the number constituting the entire row thereof, for effecting delivery of articles to said first-named means.

37. In a machine of the character set forth, the combination of means for introducing into a receptacle articles delivered to said means, means whereby a row of articles is caused to advance toward said first-named means, and means operating intermittently to move toward said first-named means, while the latter is not operating, a predetermined number of the articles, less than the number constituting the entire row thereof, and at a speed greater than that at which the articles are moved by said second-named means, for effecting delivery of articles to said first named means.

38. In a machine of the character set forth, the combination of means for introducing into a receptacle articles delivered to said means, means whereby a row of articles is caused to advance toward said first-named means, and means operating intermittently to move toward said first-named means, while the latter is not operating, a predetermined number of the articles, less than the number constituting the entire row thereof, and at a speed greater than at which the articles are moved by said second-named means, and throughout a path of less length than the total length of the articles moved at any one time by said third-named means, for effecting delivery of articles to said last-referred-to means.

39. In a machine of the character set forth, the combination of means for introducing into a receptacle articles delivered to said means, means whereby a row of articles are caused to advance toward said first-named means, stop means operating to stop the movement of said articles toward said first-named means during the operation of the latter, means for advancing a row of articles toward said first-named means and against said stop means, and means operating to intermittently engage the row of said articles and advance a predetermined number thereof at a greater speed than that at which the articles are moved by said second-named means and while said first-named means are not operating.

40. In a machine of the character set forth, the combination of means for introducing into a receptacle articles delivered to said means, means whereby a row of articles are caused to advance toward said first-named means, stop means operating to stop the movement of said articles toward said first-named means during the operation of the latter, means for advancing a row of articles toward said first-named means and against said stop means, and means operating to intermittently engage the row of said articles and advance a predetermined number thereof at a greater speed than that at which the articles are moved by said second-named means throughout a distance less than the total length of the articles advanced at any one time, and while said first-named means are not operating.

41. In a machine of the character set forth, the combination of means for introducing into a receptacle articles delivered to said means, a movable support upon which the articles to be conveyed and delivered to said means are supported, means for actuating said support, and means operating to intermittently engage the row of said articles on said support and advance on said support in the direction of movement of said support, a predetermined number of the articles to said first-named means.

42. In a machine of the character set forth, the combination of means for introducing into a receptacle articles delivered to said means, a movable support upon which the articles to be conveyed and delivered to said means are supported, means for actuating said support, and means, including a movable member with a projection thereon, operating to intermittently engage the row of said articles on said support and advance on the latter a predetermined number of the articles to said first-named means.

43. In a machine of the character set forth, the combination of means for introducing into a receptacle articles delivered to said means, means whereby the articles are moved toward said first-named means, said last-named means involving guide walls having a deflectable portion, and means located adjacent said guide walls and adapted in their movement to engage the rear surface of one of the articles by deflecting the following article, and advance along said second-named means, to said first-named means the articles extending in front of said last-named means.

44. In a machine of the character set forth, the combination of means for introducing into a receptacle articles delivered to said means, means for causing the articles to move toward said first-named means, and means operating to intermittently engage the row of said articles moved to a certain position by said second-named means and advance a predetermined number of the articles in the direction of their movement by said second-named means, to said first-named means.

45. In a machine of the character set forth, article-delivering means formed of a member adapted to be reciprocated and extend in the rear of the article to be delivered, means for reciprocating said member, a second movable member provided with a surface upon which the article is supported, said members being relatively movable in the direction of movement of said members, means connecting said second member with said first-named member for reciprocating said second member from said first-named member, said means being formed with a toggle portion, a spring tending to break said toggle portion and to move said second member relative to said first-named member in a direction to withdraw said second member from beneath the article while the latter is engaged by said first-named member, means, operating automatically, to break said toggle and permit said spring to operate as stated, and stop-means operating in the movement of said first-named member in a direction to retract said article-delivering means, to engage said second movable member and hold it against movement to permit said toggle to become restored to normal position.

46. In a machine of the character set forth, the combination of a reciprocating member provided with a support for receiving articles to be introduced into a box upon the movement of said member in one direction, a member adapted to coöperate with the upper surface of the article for preventing accidental displacement thereof on said support, and movable into and out of such position, and means, operating automatically, to cause said second-named member to be in a position in which it does not obstruct the movement of the article to said support, in the withdrawn position of said support, and to cause said member to move into article-engaging position upon the actuation of said first-named member to deliver the articles into the box.

HATTIE BECKER,
*Executrix of the estate of Benjamin H. Becker, deceased.*
JOHN CIESLA.